US009358992B2

(12) United States Patent
Lehmann et al.

(10) Patent No.: US 9,358,992 B2
(45) Date of Patent: Jun. 7, 2016

(54) MAGNETIC RAIL BRAKE DEVICE

(71) Applicant: KNORR-BREMSE GESELLSCHAFT MIT BESCHRÄNKTER HAFTUNG, Modling (AT)

(72) Inventors: Henry Lehmann, Hinterbruhl (AT); Richard Rathammer, Stillfried-Grub (AT); Stephen Bradley, Erding (DE); Csaba Nemeth, Sopron (HU)

(73) Assignee: KNORR-BREMSE SYSTEME FUR SCHIENENFAHRZEUGE GMBH, Modling (AT)

( * ) Notice: Subject to any disclaimer, the term of this patent is extended or adjusted under 35 U.S.C. 154(b) by 0 days.

(21) Appl. No.: 14/404,218

(22) PCT Filed: May 28, 2013

(86) PCT No.: PCT/EP2013/001566
§ 371 (c)(1),
(2) Date: Nov. 26, 2014

(87) PCT Pub. No.: WO2013/178350
PCT Pub. Date: Dec. 5, 2013

(65) Prior Publication Data
US 2015/0122600 A1  May 7, 2015

(30) Foreign Application Priority Data

Jun. 1, 2012  (DE) .......................... 10 2012 010 898

(51) Int. Cl.
*B61H 7/08*  (2006.01)
*B60T 1/14*  (2006.01)
(Continued)

(52) U.S. Cl.
CPC ... *B61H 7/08* (2013.01); *B60T 1/14* (2013.01); *B60T 13/748* (2013.01); *F16D 63/008* (2013.01); *F16D 2121/20* (2013.01)

(58) Field of Classification Search
CPC ..... F16D 69/02; F16D 69/026; F16D 69/027; F16D 65/062; F16D 69/04; F16D 65/092
USPC ...................... 188/165, 251 A, 251 M, 251 R
See application file for complete search history.

(56) References Cited

U.S. PATENT DOCUMENTS 412,572 A * 10/1889 Whalen et al. ........ F16D 65/062
                                                188/251 R
1,219,462 A * 3/1917 Kinzer .................. F16D 65/062
                                                188/251 R
(Continued)

FOREIGN PATENT DOCUMENTS

CN            2524995 Y    12/2002
CN            1953894 A     4/2007
(Continued)

OTHER PUBLICATIONS

Search Report issued in Int'l Application No. PCT/EP2013/001566 (2014).
(Continued)

*Primary Examiner* — Melanie Torres Williams
(74) *Attorney, Agent, or Firm* — Barnes & Thornburg LLP

(57) ABSTRACT

A magnetic rail brake device includes a magnetic main part and pole shoes with friction surfaces. The friction surfaces of the pole shoes are made of the material of the main part in first regions and of a different material in second regions.

12 Claims, 3 Drawing Sheets

(51) Int. Cl.
  *B60T 13/74* (2006.01)
  *F16D 63/00* (2006.01)
  *F16D 121/20* (2012.01)

(56) References Cited

U.S. PATENT DOCUMENTS

| | | | | |
|---|---|---|---|---|
| 1,239,448 | A * | 9/1917 | Armbrust | F16D 65/062 |
| | | | | 188/255 |
| 2,014,438 | A * | 9/1935 | Leach | F16D 69/02 |
| | | | | 188/251 R |
| 2,136,370 | A * | 11/1938 | Bockius | F16D 69/022 |
| | | | | 156/184 |
| 6,364,072 | B1 | 4/2002 | Grupp et al. | |
| 6,648,108 | B2 * | 11/2003 | Grupp | B61H 7/08 |
| | | | | 188/165 |
| 6,953,107 | B2 | 10/2005 | Lehmann et al. | |
| 7,273,135 | B2 * | 9/2007 | Aisenbrey | B29C 45/0013 |
| | | | | 188/164 |
| 8,033,365 | B2 | 10/2011 | Kassan et al. | |
| 2005/0205712 | A1 | 9/2005 | Aisenbrey | |

FOREIGN PATENT DOCUMENTS

| | | |
|---|---|---|
| DE | 1123359 | 2/1962 |
| DE | 10111685 | 9/2002 |
| DE | 10-2007-014717 | 11/2008 |
| EP | 875691 | 12/1998 |
| EP | 1370453 A1 | 12/2003 |
| FR | 1592792 | 5/1970 |
| FR | 2495559 | 6/1982 |
| GB | 903477 | 8/1962 |
| JP | H07-151172 | 6/1995 |

OTHER PUBLICATIONS

English Translation of Notification Concerning Transmittal of International Preliminary Report on Patentability and Written Opinion of the International Search Authority for International Patent Application No. PCT/EP2013/001566, dated May 28, 2013.

Republic of China Office Action for Application No. 201380028710.9, dated Nov. 3, 2015.

* cited by examiner

MAGNETIC RAIL BRAKE DEVICE

CROSS REFERENCE TO RELATED APPLICATIONS

This application is a U.S. nationalization under 35 U.S.C. §371 of International Application No. PCT/EP2013/001566, filed May 28, 2013, which claims priority to German Patent Application No. 10 2012 010 898.2, filed Jun. 1, 2012. The disclosures set forth in the referenced applications are incorporated herein by reference in their entireties.

FIELD

Disclosed embodiments relate to a magnetic rail brake device.

SUMMARY

Disclosed embodiments improve the magnetic rail device of the type mentioned at the beginning in such a way that it can be adapted to different conditions of use with respect to the attraction forces, the pressures per unit surface area between the friction partners and the wear behavior. This is achieved by the features specified in the claims.

BRIEF DESCRIPTION OF THE FIGURES

In the text which follows, the invention will be explained in more detail on the basis of exemplary embodiments and in relation to the drawing, in which.

DETAILED DESCRIPTION

Figure 1:
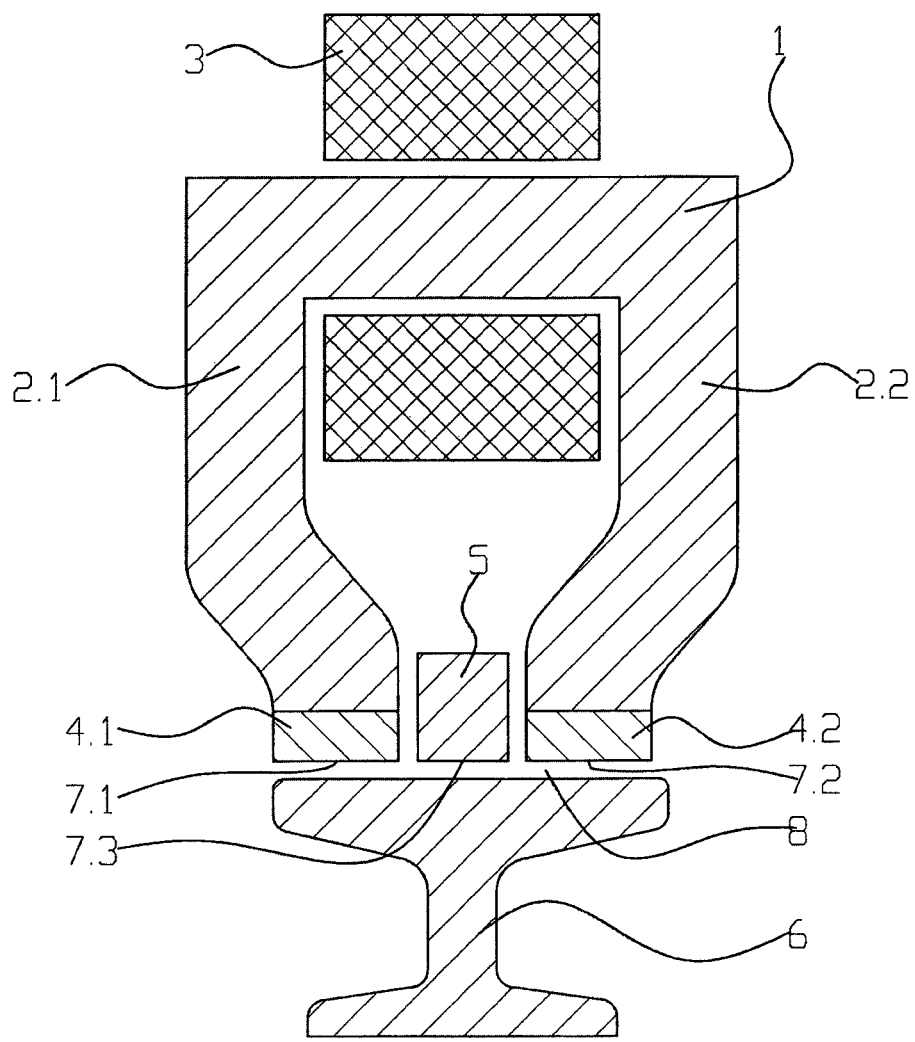
FIG. 1 shows a cross section through a magnetic rail brake device according to the invention.

Disclosed embodiments relate to a magnetic rail brake device. Such a device is known from DE 101 11 685 A1. This magnetic rail brake device has a magnetic base body with two limbs, at the ends of which pole shoes with friction surfaces are provided. Magnetic rail brake devices are generally electromagnets with a coil which is elongated in the longitudinal direction of the rail and horseshoe-like magnet cores. The direct current flowing into the solenoid generates a magnetic flux in the magnet core, which flux flows through the rail head. The braking force is dependent on the magnetic resistance of the magnetic circuit, i.e., the geometry and permeability, the electrical linkage, the coefficient of friction between the pole shoe and the rail and the state of the rail.

In the past, St37 steel was used as friction materials for the pole shoes, while DE 101 11 685 A1 proposes a sintered material as the friction material.

EP 0 875 691 B1 also proposes attaching blocks of friction material to the pole shoes, which blocks are manufactured by sintering, wherein the carrier body is subsequently cast on or the attachment is made with screwed connections.

DE-C 112359 presents a magnetic rail brake whose pole shoes have a multiplicity of magnet shoes of the same type which are arranged one behind the other in the longitudinal direction of the pole shoe, wherein some of the magnet shoes are mounted in an articulated fashion in order to be able to adapt precisely to the surface of the rail head during braking.

The frictional and wear behavior of the pole shoes is problematic. It is desirable to be able to adapt this behavior to different conditions of use.

Disclosed embodiments improve the magnetic rail device of the type mentioned at the beginning in such a way that it can he adapted to different conditions of use with respect to the attraction forces, the pressures per unit surface area between the friction partners and the wear behavior. This is achieved by the features specified in the claims.

The basic idea of the disclosed embodiments is to construct the friction surfaces of the pole shoes from different materials in individual regions. In first regions, the material of the base body, in particular steel, is used, and in second regions a material which is different therefrom, in particular a sintered material.

The following can be used, for example, as the sintered material:
  80-99% by weight of iron
  0.5-5% by weight of molybdenum sulfite
  0.5-5% by weight of carbon, or
  0.5-5% by weight of silicon carbide.

The two materials may have different magnetic properties. This also may result in different attraction forces and pressures per unit surface area between the pole shoes and the rail head.

The pole shoe may be divided into the different regions in the longitudinal direction, wherein the different regions can also have different lengths or different surface areas.

In order to avoid symmetries, the different regions can be arranged distributed differently in a first pole shoe (for example the left-hand pole shoe) than in a second pole shoe (for example the right-hand pole shoe).

Figure 6:
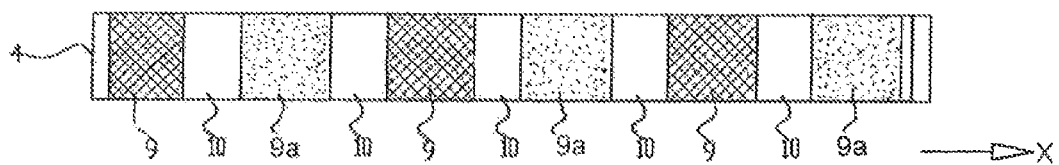
FIG. 6 shows a plan view of the friction surface of a pole shoe according to a fourth exemplary embodiment of the invention.

According to one development of the disclosed embodiments, more than two materials can also be combined, with the result that, in particular, for the second regions different materials and, in particular, different sintered materials 9, 9a can be used as seen in FIG. 6.

However, the division can also be made in the longitudinal direction of the rail, at any desired angle with respect thereto. The division does not have to extend over the entire height of the pole shoe but can also extend only as far as the height of a base support.

The second regions can also be attached to the base support in the form of a round blank.

The base support may be composed of pure iron or some other material which is a good magnetic conductor.

Figure 7:
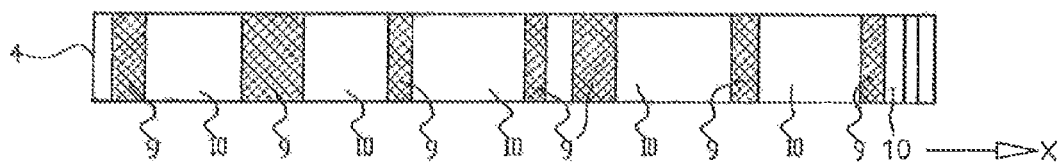
FIG. 7 shows a plan view of the friction surface of a pole shoe according to a fifth exemplary embodiment of the invention.

Non-magnetic materials can also be used as the material for the second regions. In this context, the sequence of the different materials can also vary, as can also the ratio of the surface areas of the different materials 9, 10 in the longitudinal direction of the rail as seen in FIG. 7.

The above principles can also be applied to intermediate elements and end pieces of articulated magnets. The friction materials of the pole shoes for articulated magnets can be varied within the friction surfaces of the pole shoes between the left-hand and right-hand halves of an intermediate element or of an end piece. Likewise, the friction materials of the pole shoes for articulated magnets can be varied in the longitudinal direction of the friction surfaces of the pole shoes of an intermediate element or of an end piece. All the pole shoe variants mentioned above can also he used in eddy current brakes.

FIG. 1 shows a magnetic rail brake device having a horseshoe-shaped base body 1 made of a material which is a good magnetic conductor such as, for example, steel, from which two limbs 2.1 and 2.2 protrude. A solenoid 3 is arranged on the transversely extending yoke of the base body 1, which solenoid 3 generates a magnetic field in the two limbs 2.1 and 2.2 when a direct current flows through said solenoid 3.

Pole shoes 4.1 and 4.2 are provided at the free ends of the two limbs 2.1 and 2.2. An intermediate strip 5, which is composed of a non-magnetic material, is provided between the two pole shoes 4.1 and 4.2. The pole shoes 4.1 and 4.2 face one another in the traveling mode of a rail 6 and are separated therefrom by an air gap 8. The pole shoes 4.1 and 4.2 as well as the intermediate strip 5 have friction surfaces 7.1, 7.2 and 7.3 which, in the braking mode, are lowered onto the surface of the rail 6 and pressed against the rail 6 by magnetic forces. This occurs as a result of direct current being applied to the coil 3. The magnetic circuit is therefore closed via the limbs 2.1, 2.2, the pole shoes 4.1, 4.2 and the rail 6, wherein in the case of a friction brake the base body 1 is attached to the vehicle in a displaceable fashion and as a result can close the air gap 8 so that the friction surfaces 7.1, 7.2 and 7.3 are in contact with the surface of the rail 6.

Figure 2:
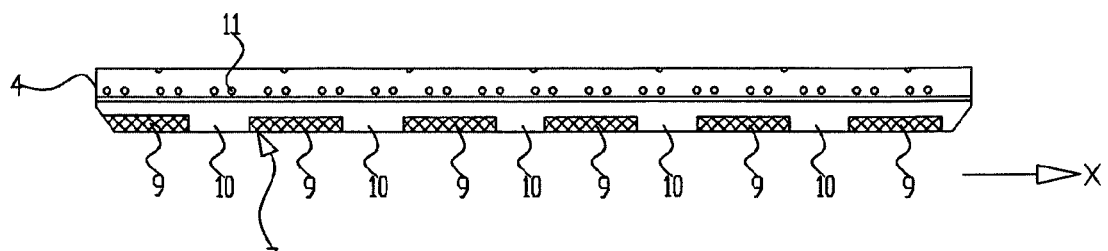
FIG. 2 shows a side view of a pole shoe according to a first exemplary embodiment of the invention.

FIG. 2 shows a side view of a pole shoe 4 which has a base carrier composed of a first material 10. This base carrier can also be connected in one piece to one of the ends 2.1 or 2.2. The base carrier 4 has a plurality of inserts made of a second material 9, in particular a sintered material, in the longitudinal direction (x) of the pole shoe. The friction surfaces of the sintered material 9 and the friction surfaces of the base body 10 lie in a plane here, with the result that first material (10) and second material (9) occur successively alternately in the longitudinal direction (x). The anchoring of the second material 9 in the base carrier 4 can be carried out in a manner known per se, as is described, for example, in EP 0 875 691 B1, for example by casting the base carrier onto the second materials 9, which have dovetail-shaped heads.

In FIG. 2, the base carrier 4 has a multiplicity of holes 11 via which it can be screwed on to the limbs 2.1 and 2.2.

Figure 3:
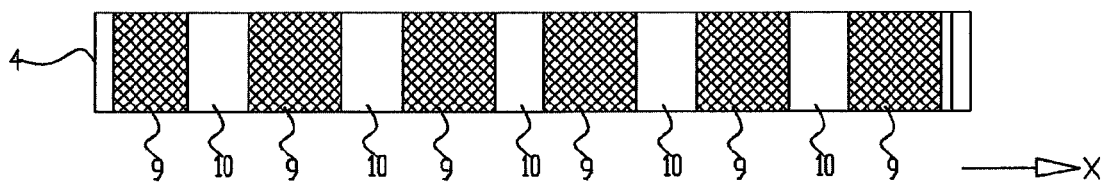
FIG. 3 shows a plan view of the friction surface of the pole shoe in FIG. 2.

FIG. 3 shows a plan view of the friction surface 7 of a pole shoe. Here, the succession of different materials 9, 10 can be clearly seen, wherein it is to be noted that the length of the different materials 9, 10 can vary in the x direction. It is also to be noted that the sequence of different materials 9, 10 on the two pole shoes 4.1 and 4.2 can be different in order to avoid symmetries.

Figure 4:
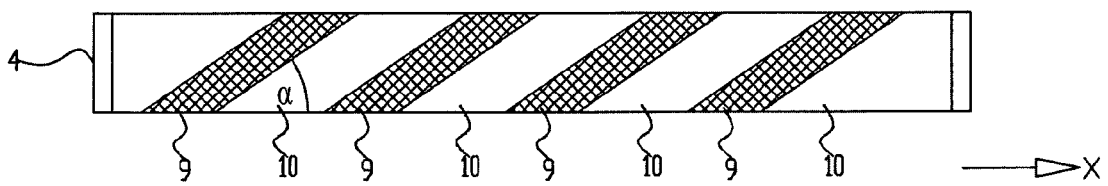
FIG. 4 shows a plan view of the friction surface of a pole shoe according to a second exemplary embodiment of the invention.

FIG. 4 illustrates that the inserts composed of the second material 9 can also be inclined at an angle a with respect to the longitudinal direction x and therefore form obliquely running strips. The width of these strips can also vary.

Figure 5:
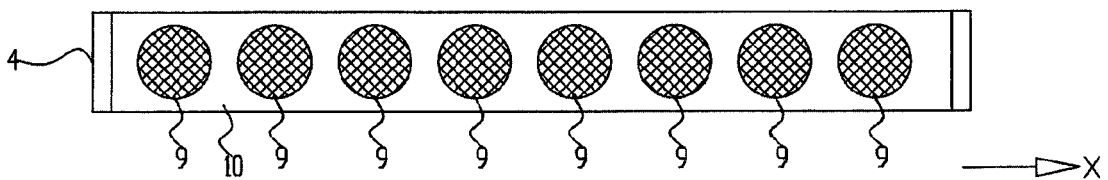
FIG. 5 shows a plan view of the friction surface of a pole shoe according to a third exemplary embodiment of the invention.

FIG. 5 shows a plan view of the friction surface of a pole shoe according to a third exemplary embodiment of the invention, in which the inserts composed of the second material 9 are in the form of round blanks.

The previously described designs of the pole shoes can be applied in the same way to intermediate elements and end pieces of articulated magnets, wherein the friction materials of the pole shoes for articulated magnets can be varied within the friction surfaces of the pole shoes between the left-hand and right-hand halves of an intermediate element or of an end piece. The friction materials of the pole shoes for articulated magnets can also be varied in the longitudinal direction of the friction surfaces of the pole shoes of an intermediate element or of an end piece.

Finally, the described pole shoe variants can also be used in eddy current brakes.

The invention claimed is:

1. A magnetic rail brake device comprising:
   a magnetic base body which has pole shoes with friction surfaces,
   wherein the friction surfaces of the pole shoes in first regions are composed of a different material than the friction surfaces in second regions of the pole shoes,
   wherein the materials of the first and second regions are arranged distributed differently on a first pole shoe than on a second pole shoe of the magnetic rail brake device.

2. The magnetic rail brake device as claimed in claim 1, wherein the friction surfaces of the pole shoes in the first regions are made of the material of the base body.

3. The magnetic rail brake device as claimed in claim 1, wherein the material of the first regions differs from the material of the base body.

4. The magnetic rail brake device as claimed in claim 1, wherein the material of the first regions is steel, and that the material of the second regions is a sintered material.

5. The magnetic rail brake device as claimed in claim 1, wherein the materials of the first and second regions have different magnetic properties.

6. The magnetic rail brake device as claimed in claim 1, wherein the materials of the first and second regions are arranged distributed one behind the other in the longitudinal direction (x) of the pole shoes.

7. The magnetic rail brake device as claimed in claim 1, wherein the materials of the first and second regions have different lengths in the longitudinal direction (x) of the pole shoes.

8. The magnetic rail brake device as claimed in claim 1, wherein the friction surfaces of the second regions further comprise regions of at least two different materials.

9. The magnetic rail brake device as claimed in claim 1, wherein the materials of the first and second regions are embodied in a strip shape, and in that the strips are arranged inclined at an acute angle (α) with respect to the longitudinal direction (x) of the pole shoes.

10. The magnetic rail brake device as claimed in claim 1, wherein the material of the second region is in the form of a round blank.

11. The magnetic rail brake device as claimed in claim 1, wherein the ratio between the friction surfaces made of the different materials varies in the longitudinal direction (x) of the rail.

12. A magnetic rail brake device comprising:
   a magnetic base body which has pole shoes with friction surfaces,
   wherein the friction surfaces in first regions of the pole shoes are composed of a different material than the friction surfaces in second regions of the pole shoes,
   wherein the friction surfaces of the second regions further comprise regions of at least two different materials.

* * * * *